M. W. TALEN.
POWER MECHANISM FOR GRAIN SHOVELS AND THE LIKE.
APPLICATION FILED AUG. 24, 1907.
946,621.
Patented Jan. 18, 1910.
2 SHEETS—SHEET 2.
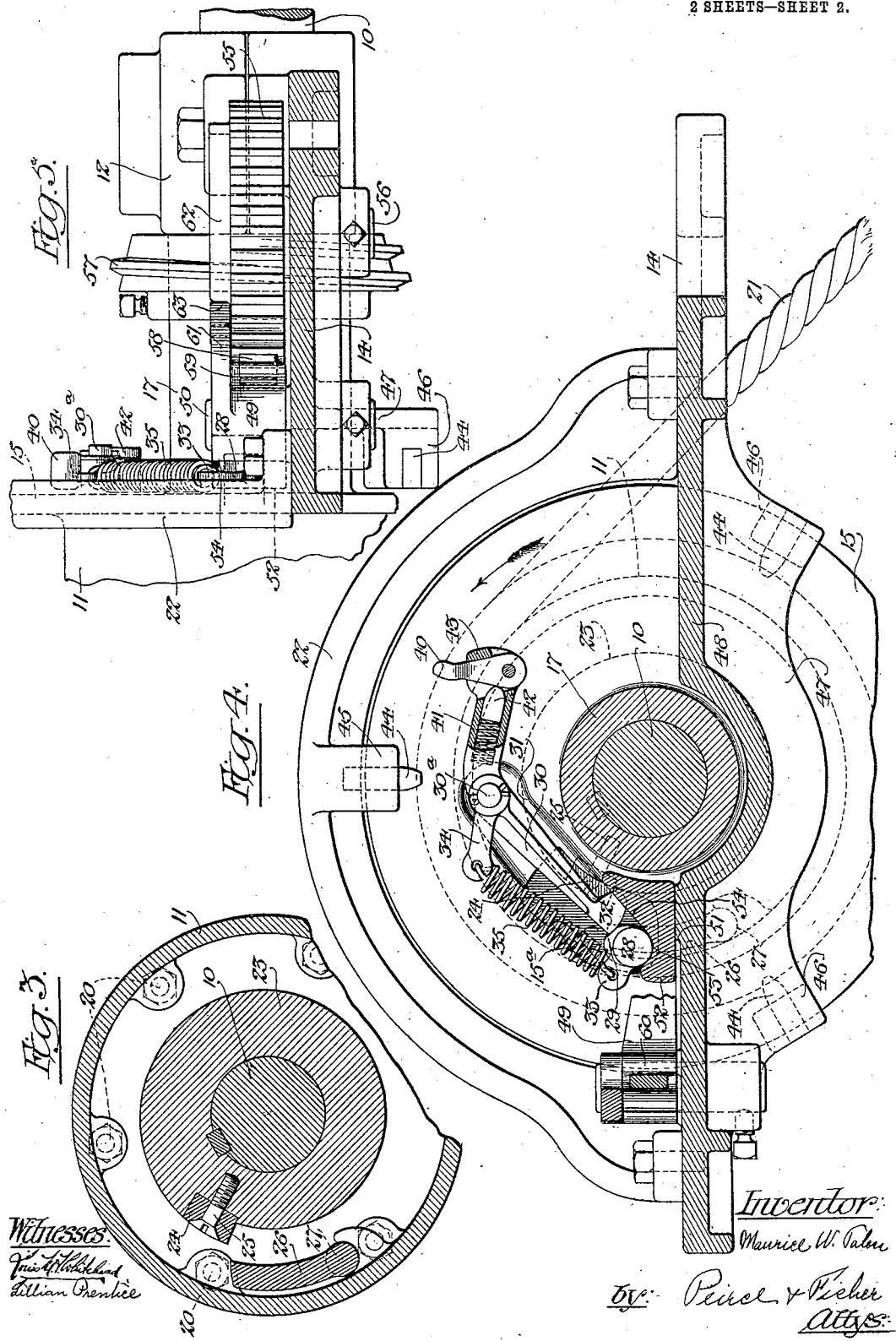

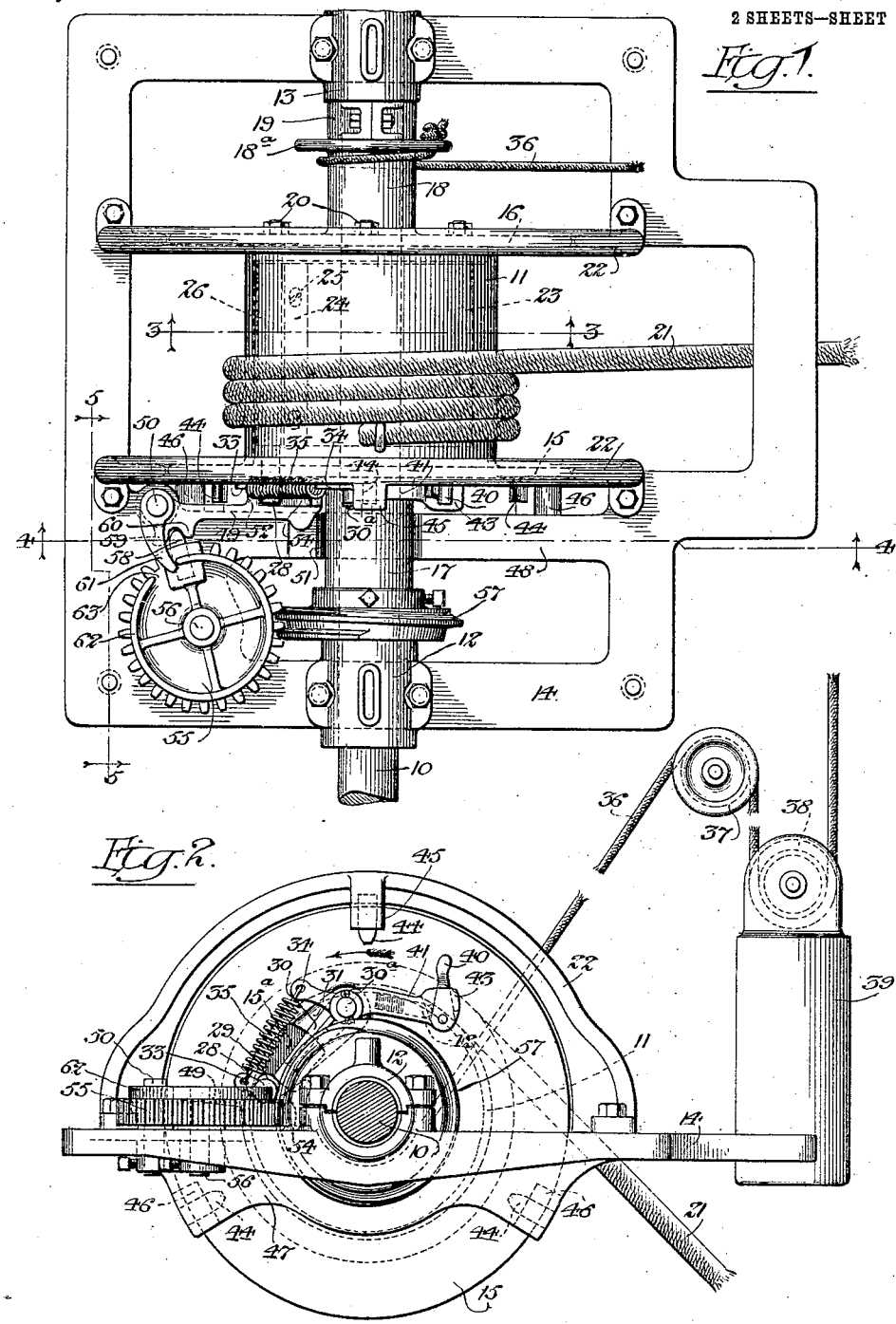

UNITED STATES PATENT OFFICE.

MAURICE W. TALEN, OF CHICAGO, ILLINOIS, ASSIGNOR TO WELLER MANUFACTURING COMPANY, OF CHICAGO, ILLINOIS, A CORPORATION.

POWER MECHANISM FOR GRAIN-SHOVELS AND THE LIKE.

946,621.     Specification of Letters Patent.      Patented Jan. 18, 1910.

Application filed August 24, 1907. Serial No. 389,960.

*To all whom it may concern:*

Be it known that I, MAURICE W. TALEN, a citizen of the United States, and a resident of Chicago, county of Cook, and State of Illinois, have invented certain new and useful Improvements in Power Mechanism for Grain-Shovels and the Like, of which the following is a specification.

The invention relates to power mechanism for shovels and the like and is particularly designed for operating shovels employed for unloading grain from cars or vessels.

The invention seeks to provide a simple and effective construction by which the grain shovel, after it is drawn back empty by the operator, will be automatically drawn ahead full of grain, and its forward movement arrested at a certain predetermined point irrespective of the extent to which it is drawn in reverse or backward direction by the operator.

The invention consists in the features of construction, combinations and arrangements of parts hereinafter set forth, illustrated in the accompanying drawings and more particularly pointed out in the appended claims.

In the drawings, Figure 1 is a plan view of the improved power mechanism. Fig. 2 is an end view thereof. Figs. 3, 4 and 5 are detail sections on lines 3—3, 4—4 and 5—5 respectively of Fig. 1.

The improved power mechanism comprises a suitable driving member or shaft 10 and a suitable driven member or winding drum 11. The drive shaft 10 is mounted in suitable bearings 12 and 13 on a supporting frame 14 and the drum 11 is preferably mounted upon the drive shaft. The frame 14 and parts carried thereby, is mounted, preferably in elevated position, upon suitable supporting beams or the like. The drum 11 is provided with flanged heads 15 and 16 which have projecting hub portions 17 and 18. The hub 17 of the head 15 abuts against the bearing 12 and a split collar 19 interposed between the bearing 13 and the outer end of the hub 18 holds the drum 11 and shaft 10 against lateral play. The head 16 is preferably secured upon the drum by a series of bolts 20 so that, by removing the split collar 19 the head 16 may be detached from the drum and slid outwardly upon the shaft. A rope 21 is wound on the drum 11 and secured thereto at one end. The other end of the rope is connected to the grain scoop or shovel (not shown). A pair of semi-circular guard bars 22 are fixed to the frame 14 and extend over the flanged heads 15 and 16 of the drum to prevent the disengagement of the rope 21 from the drum. The drive shaft head is continuously rotated from any suitable source of power in forward direction, indicated by the arrows in Figs. 2 and 4. The drum is loose on the shaft but is connected thereto to rotate in forward direction therewith by a suitable clutch mechanism. Suitable means are provided for automatically tripping the clutch mechanism into and out of operation.

The pair of coöperating members of the clutch mechanism are connected respectively to the drive member or shaft and to the driven member or drum. One of the clutch members is movable into and out of engagement with the other clutch member and a latch is provided for holding the movable clutch member in disengaged position. A trip is arranged to release said latch and engage the clutch members at the beginning of the forward movement of the drum and a stop device is arranged to disengage said movable clutch member at the end of the forward movement of the drum.

The drum 11 is hollow and the clutch part or member connected to the shaft is preferably in the form of a cam-shaped sleeve 23 (see Figs. 3 and 4), mounted on the shaft within the hollow drum. The cam-shaped clutch member 23 extends between the heads or ends 15 and 16 of the drum and is provided with a longitudinally extending lip or shoulder preferably formed by an inserted strip 24 of hardened steel secured to the clutch member by the screws 25. The other clutch member is in the form of a dog or wing 26 arranged within the drum 11 and provided with pintles 27 at its opposite ends by which it is pivotally mounted in the drum adjacent the wall thereof so that it may shift into and out of engagement with the cam-shaped clutch member 23 and the lip or shoulder 24 thereof.

At one end and near its free edge, the clutch dog or wing 26 is provided with a lug or pin 28 that projects laterally through an opening 15ᵃ in the end or head 15 of the drum. A latch 30 is arranged within a recess 31 in the outer face of the head 15 of the drum and is pivotally mounted upon a stud or pin 30ᵃ. This latch is provided with a cam-shaped head 32 at its free end which coöperates with a cam-shaped shoulder 29 on the lug 28 to hold the clutch dog 26 in disengaged position. The lug or pin 28 of the clutch dog and the hub of the latch 30 are provided with projecting arms or offset parts 33 and 34 that are connected by a coiled spring 35. The spring 35 tends to throw the latch 30 inwardly into the position shown in the drawings to hold the clutch dog 26 in disengaged position, and also serves to throw the clutch dog, when the latch is tripped, into engagement with the clutch member 23. Separate springs could be provided for the latch and clutch dog, but by the arrangement shown, a single spring will suffice. When the latch 30 is tripped or thrown outwardly, the spring 35, as stated, throws the clutch dog 26 into engagement with the cam-shaped clutch member 23 and the cam head 32 on the latch and the cam shoulder 29 on the clutch dog, are so shaped that, when this occurs the latch 30 will be held in its tripped position by the engagement of the shoulder 29 with the head 32 thereof and the clutch dog will be held by the spring 32 against the surface of the cam-shaped clutch member 23 until the shoulder 24 thereof engages the clutch dog to drive the drum 11 in forward direction.

The latch 30 holds the clutch dog 26 in disengaged position during the reverse or unwinding movement of the drum which takes place as the operator drags back the empty shovel or scoop on the end of the rope 21. At any desired point, the operator thrusts the shovel or scoop in forward direction into the grain thus giving a slack to the rope 21. Suitable means are provided for imparting an initial movement to the drum in forward direction when this occurs. On such initial forward movement of the drum, a one-way acting trip block is arranged to coöperate with a suitable abutment to release the latch 30 so that the clutch members may be thrown into engagement and the drum driven in forward direction to carry the loaded scoop or shovel to the desired point.

The means for imparting the initial forward movement to the drum preferably comprises a rope 36 (see Figs. 1 and 2) wound upon the hub 18 of the drum and secured to the flange 18ᵃ at the outer end thereof. Rope 36, in the form shown, passes over a fixed guide pulley 37, thence downwardly over a guide pulley 38 journaled in the upper end of a weight 39, and thence upwardly to some fixed point to which the free end of the rope is secured. The rope 36 is wound upon the hub 18 in the reverse direction to that in which the rope 21 is wound upon the drum 11, so that the rope 36 is wound upon the hub as the rope 21 is unwound during the reverse movement of the drum and as the operator draws the scoop back to the grain. But when the operator thrusts the scoop in forward direction into the grain and allows slack to the rope 21, the weight 39 will act through the rope 36 to impart a slight initial movement in forward direction to the drum.

A one-way acting trip block 40 is pivotally mounted in a recess in the outer end of an arm 41 that projects from the hub of the latch 30. A spring pressed-plunger 42 arranged within a socket in the arm 41 normally holds the trip block 40 against a stop 43 at the outer end of the arm 41. One or more fixed or stationary abutments 44 are arranged in the path of movement of the trip block and in the form shown, three of such abutments are employed. One of these is mounted in a depending lug 45 on the guard bar 22 and two of them are mounted upon lugs 46 arranged on a flange 47 that depends from a cross bar 48 of the frame 14. During the reverse or unwinding movement of the drum, the engagement of the trip block 40 with the abutment 44 merely serves to oscillate the trip block upon its pivot so that it passes idly over the abutments. On the initial forward movement of the drum effected by the weight 39, the trip block 40 will be held against oscillation on its pivot by the stop 43 so that it engages one of the abutments 44, and the arm 41 of the latch will be moved inwardly toward the shaft 10 while the latch itself will be moved outwardly to release the clutch dog 26. The latter is then shifted by the spring 35 into engagement with the cam-shaped clutch member 33 upon the drive shaft. The cam head 32 on the latch and the cam shoulder 29 on the clutch dog will then coöperate to hold the latch in its tripped position with the trip block 40 out of line with the several abutments 44. By providing three abutments 44 placed at equal distances apart about the axis of the drum, the initial forward movement of the drum required to trip the latch is never more than one-third of a revolution so that the operator may set the mechanism into operation at any desired point by thrusting the scoop into the grain in forward direction for a sufficient distance to give a slight slack on the rope. The latch is then tripped as described, and the loaded scoop drawn forward.

The forward movement of the drum and scoop is controlled by a suitable stop dog 49 mounted to swing on a vertical pivot pin or bolt 50 at one end of the cross bar 48 of the frame. The inner end of the stop dog rests upon a raised shoulder 51 on the cross bar 48 and is provided with an offset head 52 having a recess 53 therein and an upwardly and inwardly inclined cam face 54. A worm gear 55 is journaled upon a vertical stud or bolt 56 that is fixed to the frame 14. The teeth of the worm gear are engaged by a worm 57 which is fixed upon the outer end of the hub 17 of the drum so that the gear 55 is driven in opposite directions as the drum is rotated in reverse and forward direction. At one portion, the gear 55 is provided with a projecting tooth or finger 58 which is arranged to engage a pair of lugs 59 and 60 formed on the stop dog 49 near its pivoted end. The pivoted end of the stop dog is also provided above the lugs 59 and 60 with a projecting finger 61 which extends over the teeth of the gear 55 and is arranged to coöperate with a circular upwardly projecting flange 62 on the upper face of the gear. At the end of the forward movement of the drum and scoop or shovel operated thereby, the finger 61 on the stop dog 49 extends within a notch 63 on the flange 62 and the stop dog is held in the position shown in the drawings with the pin or lug 28 of the clutch dog in the recess 53 on the head of the stop dog. In all other positions of the drum, the finger 61 coöperates with the outer cylindrical surface of the flange 62 to hold the stop dog 59 in disengaged position.

In operation for unloading grain from railway cars, vessels and the like, it may be necessary to run the rope 21, which is attached to the grain scoop or shovel, around one or more guide pulleys. When the grain scoop or shovel is at the point where the grain is to be dumped or discharged therefrom, the parts of the power mechanism are in the position shown in the drawings with the latch 30 and stop dog 49 engaging the cam shoulder 29 and pin or lug 28 on the clutch dog 26, which is then in disengaged position. The operator carries the empty scoop or shovel back to the grain and unwinds the rope 21 while the drum rotates in reverse direction. This reverse movement of the drum winds up the rope 36 and weight 39. At the beginning of this reverse movement, the worm 57 rotates the worm gear 55 and the finger 58 thereon operating against the lug 59 shifts the stop dog 49 about its pivot pin and out of engagement with the pin 28 on the clutch dog 26. The stop dog is then held in disengaged position during the further reverse and forward movement of the drum by the engagement of the finger 61 on the stop dog to the cylindrical surface of the flange 62 on the worm gear. The clutch dog is however held in disengaged position during the reverse or unwinding movement of the drum by the latch 30. At any desired point the operator may set the power mechanism into operation by thrusting the shovel forwardly to give slack to the rope 21 and permit the weight 39 to impart an initial forward movement to the drum sufficiently to engage the trip block 40 with one of the abutments 44 and release the latch 30. The clutch dog 26 connected to the drum is then thrown into engagement with the cam-shaped clutch member 23 on the continuously rotating drive shaft 10 and the drum and loaded shovel or scoop connected thereto is driven in forward direction. During the forward movement of the drum, gear 55 is moved back and when the scoop reaches the point of discharge the finger 61 on the stop dog will pass into the notch 63 of the flange 62 and the finger 58 of the gear will engage the lug 60 of the dog and shift it into the position shown in the drawings. The cam surface 54 on the head of the stop dog will then engage the pin 28 on the clutch dog 26 and shift the latter to its disengaged position shown in the drawings and arrest the further forward movement of the drum and shovel or scoop operated thereby. Latch 30 is then shifted to position to hold the clutch dog 26 out of operation until the latch is again released in the manner described.

The improved power mechanism is simple and durable in construction, may be set in motion by the operator at the desired distance from the point at which the load is to be dumped and, when the load is dragged back to such given point, the operation is automatically arrested.

It is obvious that the power mechanism may be readily employed for other purposes than that set forth and that the details may be varied without departure from the essentials of the invention.

Having described my invention, what I claim as new and desire to secure by Letters Patent, is:—

1. In power mechanism for grain shovels and the like, the combination with driving and driven members, of coöperating clutch members connected respectively to said driving and driven members, a latch for holding said clutch members apart, means controlled by the initial movement of said driven member in forward direction for tripping said latch to engage said clutch members and a stop-dog for positively arresting one of said clutch members and for disengaging it from the other clutch member at the end of the forward movement of said driven member, substantially as described.

2. In power mechanism for grain shovels and the like, the combination with rotary driving and driven members, of coöperating clutch members connected respectively to said driven and driving members, one of said clutch members being shiftable into and out of engagement with the other, a latch for holding said movable clutch member in disengaged position, means for imparting an initial movement to said driven member in forward direction, means controlled by said initial movement of the driven member for tripping said latch to engage the clutch members, and a stop-dog controlled by said driven member for disengaging and positively arresting said movable clutch member after a predetermined movement of said driven member in forward direction, substantially as described.

3. In power mechanism for grain shovels and the like, the combination with the drive-shaft and a winding drum, of clutch members, one of which is movable into and out of engagement with the other, said clutch members being connected respectively to said shaft and drum, a latch for holding said movable clutch member in disengaged position during the reverse movement of the drum, means for imparting an initial movement to said drum in forward direction, means controlled by such initial movement of the drum for tripping said latch to engage the clutch members and a stop-dog shifted by the movement of the drum into and out of the rotary path of movement of a part on said movable clutch member to arrest and disengage the same at the end of the forward movement of said drum, substantially as described.

4. In power mechanism for grain shovels and the like, the combination with a drive-shaft and a winding drum, of coöperating clutch members, one of which is spring-pressed toward the other, said clutch members being connected respectively to said shaft and drum, a latch for holding said spring-pressed clutch member in disengaged position during the reverse movement of the drum, suitable means for imparting an initial movement in forward direction to said drum, one-way acting tripping means for said latch operated by the initial movement of the drum and a stop device controlled by the drum for positively arresting and disengaging said spring-pressed clutch member at the end of the forward movement of the drum, substantially as described.

5. In power mechanism for grain shovels and the like, the combination with driving and driven members, of coöperating clutch members connected respectively to said driving and driven members, means for automatically throwing said clutch members into engagement at the beginning of the forward movement of the driven member, a stop device for disengaging said clutch members and operating mechanism connecting said driven member and stop device for throwing the latter into the rotary path of movement of a part on one of said clutch members at the end of the forward movement of said driven member, substantially as described.

6. In power mechanism for grain shovels and the like, the combination with the rotary driving and driven members, of coöperating clutch members connected respectively to said driving and driven members, means for imparting a slight initial forward movement to said drum member, means connected to and controlled by the initial forward movement of said driven member for engaging said clutch members, a stop device for disengaging said clutch members and mechanism between said driven member and said stop device for throwing the latter into the rotary path of movement of a part on one of said clutch members at the end of the forward movement of said driven member, substantially as described.

7. In power mechanism for grain shovels and the like, the combination with a drive shaft and a winding drum, of clutch members for connecting said shaft and drum, means for imparting an initial forward movement to said drum, means connected to and operated by the initial forward movement of the drum for engaging said clutch members, a stop-dog having a cam-surface arranged to coöperate with a part on one of said clutch members to force the same apart, gearing driven from said drum and means operated thereby for throwing and holding said stop-dog out of the rotary path of movement of said part on the reverse movement of said drum and for shifting the same into the path of movement of said part at the end of the forward movement of the drum, substantially as described.

8. In power mechanism for grain shovels and the like, the combination with a drive-shaft and a winding drum, of coöperating clutch members, one of which is spring-pressed toward the other, said clutch members being connected respectively to said shaft and drum, a latch for holding said spring-pressed clutch member in disengaged position during the reverse movement of the drum, means for imparting an initial forward movement to the drum, a one-way acting trip-block and a coöperating abutment for releasing said latch on such initial movement of the drum, a stop-dog for positively arresting and disengaging said spring-pressed clutch member at the end of the forward movement of the drum and operating mechanism for said stop-dog driven from the drum, substantially as described.

9. In power mechanism for grain shovels and the like, the combination with a drive-shaft and a winding drum, of coöperating clutch members, one of which is spring-pressed toward the other, said clutch members being connected respectively to said shaft and drum, a latch for holding said spring-pressed clutch member in disengaged position during the reverse movement of the drum, means for imparting an initial forward movement to the drum, a one-way acting trip-block and a coöperating abutment for releasing said latch on such initial movement of the drum, a stop-dog having a cam-surface for disengaging said spring-held clutch member and operating gearing driven from the drum for throwing said stop-dog into operation with its cam surface in the path of movement of a part on said clutch member at the end of the forward movement of the drum and out of operation at the beginning of the reverse movement thereof, substantially as described.

10. In power mechanism for grain shovels and the like, the combination with a drive-shaft and a winding drum, of a clutch member connected to said shaft, a coöperating clutch connected to said drum and movable into and out of engagement with the other clutch member, means for imparting an initial forward movement to said drum, means connected to and moving with said drum and acting at the initial forward movement thereof for throwing said movable clutch member into engagement, a stop-dog for positively arresting and disengaging said movable clutch-member and means driven from the drum for shifting said stop-dog, substantially as described.

11. In power mechanism for grain shovels and the like, the combination with a winding drum and a rotary driving member therefor normally disconnected from said drum, of a clutch member connected to said drum and relatively movable into and out of engagement with said rotatable driving member, a spring for forcing said clutch member to its engaged position, a latch mounted on said drum and normally holding said clutch member in disengaged position with its spring under tension, means for imparting an initial forward movement to said drum, a one-way acting trip and a coöperating abutment for disengaging said latch on such initial forward movement, a stop-dog coöperating with a part on said spring-held clutch member to shift the same to disengaged position against the tension of its spring, and operating gearing driven from the drum for throwing said stop-dog into the path of movement of the part on said clutch member at the end of the forward movement of the drum and out of said path of movement at the beginning of the reverse movement thereof, substantially as described.

12. In power mechanism for grain shovels and the like, the combination with a drive shaft and a winding drum loosely mounted thereon, of a clutch member fixed to said shaft, a clutch dog pivoted on said drum and spring-pressed into engagement with the clutch member on said shaft, a latch on said drum arranged to hold said clutch dog in disengaged position with its spring under tension, means for imparting an initial forward movement to the drum, a one-way acting trip device for disengaging said latch on the initial forward movement of the drum, a stop-dog mounted on a stationary part and shiftable transversely into and out of the rotary path of movement of a part on said clutch dog, and operating gearing driven from the drum for moving said stop-dog into the rotary path of movement of the part at the end of the forward movement of the drum to disengage said clutch dog and for shifting the stop-dog out of said path of movement at the beginning of the reverse movement of the drum, substantially as described.

13. In power mechanism for grain shovels and the like, the combination with a drive-shaft, of a winding drum loosely mounted on said shaft, coöperating clutch members connected respectively to said shaft and said drum, one of said clutch members being movable into and out of engagement with the other, a latch for holding said movable clutch member in disengaged position, means for imparting an initial forward movement to the drum, a one-way acting trip for releasing said latch on the initial forward movement of the drum, a stop-dog for positively arresting and disengaging said movable clutch member and means driven from the drum for shifting said stop-dog into and out of operative position, substantially as described.

14. In power mechanism for grain shovels and the like, the combination with a drive-shaft, of a winding drum loosely mounted on said shaft, a clutch member fixed to said shaft, a spring-pressed clutch-dog mounted on said drum, a spring-actuated latch mounted on said drum for holding said clutch-dog in disengaged position during the reverse movement of said drum, means for imparting an initial forward movement to said drum, a one-way acting trip-block and a coöperating abutment for releasing said latch on the initial forward movement of the drum, a stop-dog for disengaging said clutch-dog at the end of the forward movement of the drum and means driven from the drum for shifting said stop-dog into and out of the rotary path of movement of a part on said clutch dog, substantially as described.

15. In power mechanism for grain shovels and the like, the combination with a drive-shaft, of a winding drum loosely mounted on said shaft, a clutch member fixed to said shaft, a spring-pressed clutch-dog mounted on said drum, a spring-actuated latch mounted on said drum for holding said clutch-dog in disengaged position during the reverse movement of said drum, means for imparting an initial forward movement to said drum, a one-way acting trip-block and a coöperating abutment for releasing said latch on the initial forward movement of the drum, a stop-dog having a cam-face for disengaging said clutch-dog and gearing driven from the drum having a finger for throwing said stop-dog into and out of operation at the end of the forward and at the beginning of the reverse movements of the drum respectively, and said gearing having a notched surface for holding said stop-dog out of operation during the reverse and forward movements of the drum, substantially as described.

16. In power mechanism for grain shovels and the like, the combination with a drive-shaft, of a winding drum loosely mounted on said shaft, a clutch member fixed to said shaft, a spring-pressed clutch-dog mounted on said drum, a spring-actuated latch mounted on said drum for holding said clutch-dog in disengaged position during the reverse movement of said drum, means for imparting an initial forward movement to said drum, a one-way acting trip-block and a coöperating abutment for releasing said latch on the initial forward movement of the drum, a stop-dog and worm gearing driven from the drum having a finger or tooth for throwing said stop-dog into and out of operation and a notched surface coöperating with said stop-dog for holding the same out of operation during a predetermined movement of the drum, substantially as described.

17. In power mechanism for grain shovels and the like, the combination with a drive-shaft, of a winding drum loosely mounted on said shaft, a clutch member fixed to said shaft, a spring-pressed clutch-dog mounted on said drum, a spring-actuated latch mounted on said drum for holding said clutch-dog in disengaged position during the reverse movement of said drum, means for imparting an initial forward movement to said drum, a one-way acting, spring-held trip-block on said latch, a stationary abutment or abutments with which said trip-block coöperates on the initial forward movement of the drum to release said latch, a stop-dog for disengaging said clutch-dog and means driven from the drum for shifting said clutch-dog into and out of operation, substantially as described.

18. In power mechanism for grain shovels and the like, the combination with a drive-shaft, of a hollow winding drum loosely mounted on said shaft, a shouldered, cam-shaped clutch member within said drum and fixed to said shaft, a coöperating spring-pressed clutch-dog or wing mounted within said drum and pivoted to the ends thereof, a latch mounted on said drum for holding said clutch-dog in disengaged position, means for imparting an initial forward movement to said drum, one-way acting means for releasing said latch at the initial forward movement of the drum and a stop-dog for disengaging said clutch-dog at the end of the forward movement of the drum, substantially as described.

19. In power mechanism for grain shovels and the like, the combination with a drive-shaft, of a hollow winding drum loosely mounted on said shaft, a shouldered, cam-shaped clutch member within said drum and fixed to said shaft, a coöperating spring-pressed clutch-dog or wing mounted within said drum and pivoted to the ends thereof, a spring-held latch mounted on one end of the drum for holding said clutch-dog in disengaged position during the reverse movement of said drum, means for imparting an initial forward movement to the drum, a one-way acting trip-block on the latch, an abutment with which said trip-block engages to release said latch on the initial forward movement of the drum, a stop-dog for disengaging said clutch dog, and gearing driven from the drum for throwing said stop-dog into operation at the end of the forward movement of the drum and out of operation at the beginning of the reverse movement thereof, substantially as described.

MAURICE W. TALEN.

Witnesses:
LILLIAN PRENTICE,
KATHARINE GERLACH.